United States Patent [19]

Brockschmidt, Jr. et al.

[11] Patent Number: 4,945,442
[45] Date of Patent: Jul. 31, 1990

[54] PROTECTIVE CIRCUITRY FOR HIGH-ENERGY TRANSIENTS

[75] Inventors: Arthur E. Brockschmidt, Jr., Renton; Richard J. Jameson, Seattle, both of Wash.

[73] Assignee: The Boeing Company, Seattle, Wash.

[21] Appl. No.: 432,339

[22] Filed: Nov. 6, 1989

Related U.S. Application Data

[63] Continuation of Ser. No. 302,994, Jan. 30, 1989, abandoned, which is a continuation of Ser. No. 19,516, Feb. 26, 1987, abandoned.

[51] Int. Cl.$^5$ ............................................... H02H 9/04
[52] U.S. Cl. ...................................... 361/56; 361/111; 361/113; 361/120; 361/127
[58] Field of Search .................. 361/4, 8–12, 361/56, 54, 58, 88, 91, 111, 117–120, 127, 113, 126, 137; 337/28, 31; 338/21, 22 R, 225 D

[56] References Cited

U.S. PATENT DOCUMENTS

| | | |
|---|---|---|
| 1,211,822 | 1/1917 | Chernyshoff . |
| 1,212,129 | 1/1917 | Chernyshoff . |
| 1,966,077 | 7/1934 | Nyman . |
| 2,208,399 | 7/1940 | Slepian . |
| 3,246,206 | 4/1966 | Chowdhuri . |
| 3,566,197 | 2/1971 | Nilsson . |
| 3,585,449 | 6/1971 | Dethlefsen . |
| 3,654,511 | 4/1972 | Iwaya . |
| 3,673,459 | 6/1972 | Carpenter ..................... 361/137 X |
| 3,777,179 | 12/1973 | Lutz ................................... 307/136 |
| 3,809,959 | 5/1974 | Pucher . |
| 4,233,641 | 11/1980 | Baumbach ......................... 361/119 |
| 4,652,964 | 3/1987 | Ziegenbein ..................... 361/56 X |

*Primary Examiner*—Todd E. DeBoer
*Attorney, Agent, or Firm*—Finnegan, Henderson, Farabow, Garrett & Dunner

[57] ABSTRACT

A protective circuit utilizing a variable impedance. In one aspect, where a spark gap is utilized, a low impedance capacitor connected to the electrodes forming the gap by low impedance leads operates to terminate an arc passing across the gap when the voltage is reduced below a predetermined breakdown voltage. In another aspect, a varistor is utilized. A pair of input and output terminals is spaced a selected distance apart to improve performance at high frequencies. A permanent short is created if the varistor is destroyed by a high-energy transient.

39 Claims, 3 Drawing Sheets

Fig. 4

PROTECTIVE CIRCUITRY FOR HIGH-ENERGY TRANSIENTS

The U.S. Government has rights in this invention pursuant to Contract No. F04704-83-C-0047, awarded by the U.S. Air Force.

This application is a continuation of application Ser. No. 07/302,994, filed Jan. 30, 1989 now abandoned which is a continuation of application Ser. No. 07/019,516, filed Feb. 26, 1987, both abandoned.

FIELD OF THE INVENTION

This invention relates to circuitry for handling high-energy transients on electrical lines.

BACKGROUND OF THE INVENTION

Protection of circuit components against high-energy transients, such as due to nuclear explosions or lightning, requires that the protection circuitry divert the transients or attenuate them so that the breakdown level of the circuit components is not attained. For electrical lines carrying power to the circuit components, devices such as varistors and spark gaps have been employed in order to divert the transient to ground before it reaches the circuit components.

A varistor is a resistor whose current/voltage characteristic is very non-linear, so that its resistance varies substantially with voltage. If the voltage across it exceeds a predetermined value (slightly above the normal voltage to ground of the power transmission line), the high voltage of the transient results in the varistor exhibiting a very low impedance. Thus, a varistor connected between an electrical line and ground can effectively discharge the high-energy transient to ground.

Commercially available varistors, such as metal oxide varistors, are typically constructed in a manner that limits their suitability for protecting circuit components of a weapons system against damage from transients caused by the high energy, high frequency, and high thermal stress that can be associated with, for example, a nuclear explosion.

In typical varistor assemblies, a varistor is connected to an electrical line by a single contact or terminal. Unfortunately, for high frequency transients on the order of, for example, 2-3 MHz, a significant amount of self-inductance exists in a copper strip that connects the single input/output terminal to the varistor. As a result of this inductance, a substantial amount of the transient will reach the circuit components and will not be diverted to ground, e.g., on the order of 8 kilovolts will not be diverted for a 10 kilovolt 100 MHz transient.

Also, such varistor assemblies fail in an open-circuit mode for very high energy transients. The occurrence of such high-energy transients is regarded as so rare that there will be time to replace the protection circuitry. The failure of the varistor in the open-circuit mode is regarded as acceptable as long as circuit components are protected from the initial high-energy transient. In a weapons system, however, an open-circuit failure mode is not acceptable. In a nuclear weapons scenario, very high-energy transients are to be expected. Furthermore, the weapons system typically will have back-up power for driving circuit components. Therefore, the weapons system can still operate after a very high-energy transient, but is disabled by any subsequent transients because of the open-circuit condition of the failed varistor.

Finally, thermal stress is created as a result of changes in temperature when there is pressure contact between the varistor, typically ceramic, and a single metal plate or strip. The expansion and contraction of the metal plate creates stress on the varistor, which is a significant problem because a prime failure mode for the varistor occurs when the varistor is cracked.

A spark gap is a pair of electrodes so designed that a spark or an arc can safely pass between them when the voltage across them exceeds a predetermined breakdown value. When arcing occurs, the gap region is ionized and electrons emitted by the cathode cross the gap and reach the anode. A spark gap between the conductors in a DC power line protects against damage to circuit components due to high-energy transients. Unfortunately, although an arc will begin to pass between the electrodes only when the breakdown voltage is exceeded, the normal system voltage to the transient will usually be sufficient to maintain the arc across the gap, necessitating the circuit being momentarily switched off.

Several methods have been employed in order to terminate the arc when the voltage on the power line returns to normal. Horn gaps extend the length of the arc so that it extinguishes more easily by using extended electrodes along which the extremely hot arc will travel. Magnetic fields can be applied to the gap to slow down or divert the electrons crossing the gap. Additionally, the gap can be cooled so that the arc will terminate.

SUMMARY OF THE INVENTION

It is an object of the invention to provide protection circuitry for high-energy transients that performs well under conditions of very high energy, high frequency, and high thermal stress. It is an additional object of the invention to provide protection circuitry for high-energy transients that extinguishes an arc across a spark gap when the line voltage is reduced to its normal value.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve these and other objects and in accordance with the purpose of the invention, as embodied and broadly described herein, the circuit of the present invention for protecting an electrical power line having a pair of conductors from high-energy transients comprises: a variable impedance device electrically connected to the pair of conductors and being operative to exhibit a low impedance at times when a voltage on the electrical power line exceeds a predetermined value, including at times when a high frequency transient is on the power line, the variable impedance means being operative to exhibit a high impedance at times when the voltage on the electrical power line is reduced below the predetermined value.

In one aspect of the present invention there is provided a circuit for terminating an arc across a spark gap, comprising: an electrical power line including a pair of conductors; a pair of spaced electrodes connected to the pair of conductors and forming a spark gap, being operative to pass an arc between the electrodes at times when a voltage on the electrical line exceeds a predetermined value; a low impedance capacitor for terminating the arc passing between the electrodes at times when the voltage on the electrical line is reduced below the predetermined value; and a low impedance pair of leads having a preselected length and cross-sectional area for connecting the capacitor to the pair of electrodes.

In another aspect of the invention, there is provided a circuit for diverting to ground a high-energy transient on one conductor of an electrical power line including a pair of conductors, comprising: a conductor plate including an input terminal and an output terminal spaced from the input terminal for electrically connecting the conductor plate to the one conductor; a ground plate adapted to be electrically connected to ground, the ground plate being substantially parallel to and spaced from the conductor plate; a varistor disposed between and electrically connected to a region of the conductor plate and of the ground plate, the varistor having a low impedance only at times when the voltage on the conductor plate exceeds a predetermined value, for diverting to ground high-energy transients on the one conductor; the input terminal and output terminal being spaced a distance not less than the distance between the input terminal and the region of the conductor plate electrically connected to the varistor, wherein at high frequencies the impedance between the input terminal and the output terminal is not less than the impedance between the input terminal and the varistor.

The accompanying drawings which are incorporated in and constitute a part of the specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings.

Figure 3:
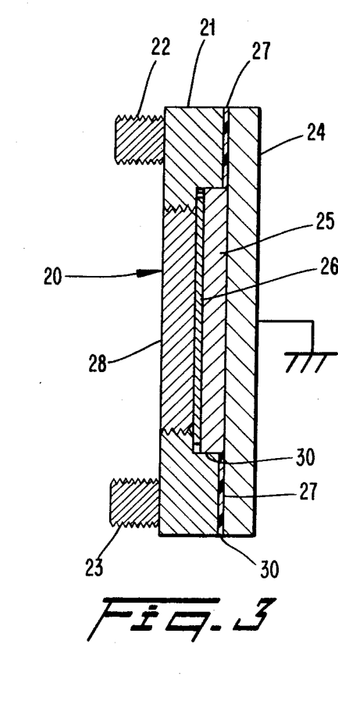
FIG. 3 is a sectional view of the assembly of FIG. 2 taken at line 3—3 of FIG. 2 and looking in the direction of the arrows.

In accordance with the invention, a circuit for protecting an electrical power line is provided. The protection circuit includes a variable impedance device electrically connected to the pair of conductors. At times when a voltage on the electrical power line exceeds a predetermined value, i.e., the breakdown voltage, the variable impedance device is operative to exhibit a low impedance, even when a high frequency transient is on the power line. At times when the voltage on the electrical power line is reduced below the predetermined value, the device exhibits a high impedance. As embodied herein, the variable impedance means can be a pair of spaced electrodes 15 and 16 forming a spark gap in combination with a low impedance capacitor 17 and pair of leads 18 and 19 (FIG. 1), or a varistor 25 in combination with a conductor plate 21 including a spaced apart input terminal 22 and output terminal 23 (FIG. 3).

Figure 1:
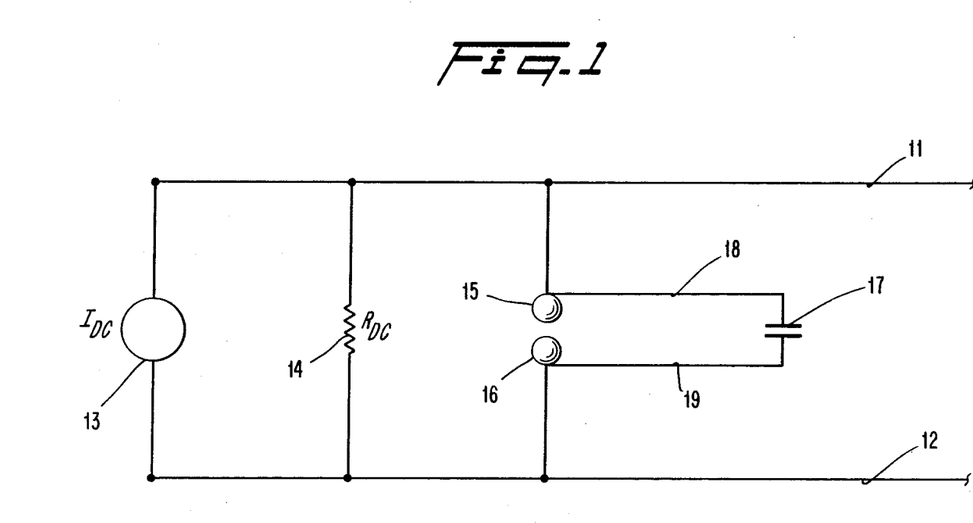
FIG. 1 is a schematic diagram of a circuit incorporating a first embodiment of the invention.
Figure 4:
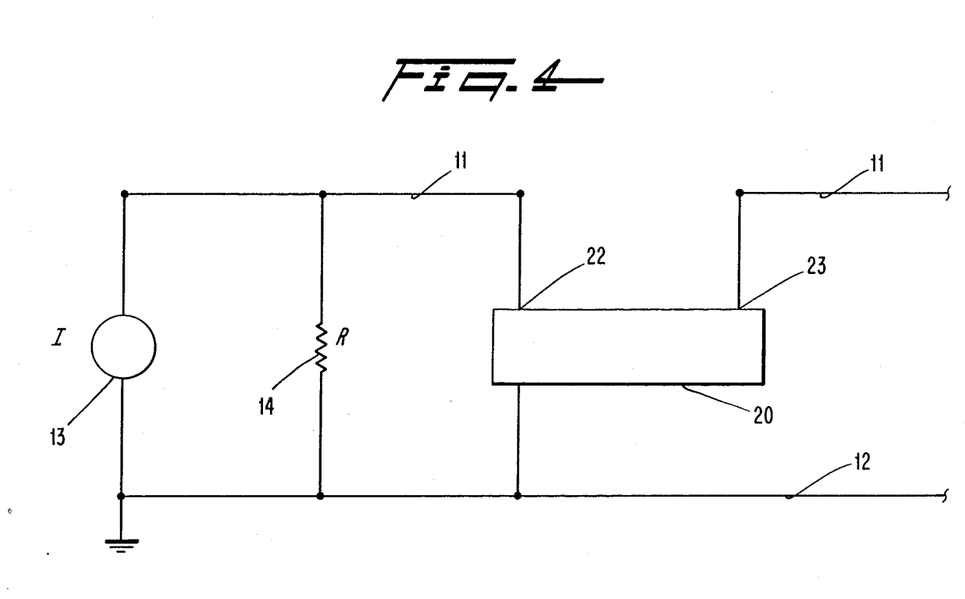
FIG. 4 is a schematic diagram of a circuit constructed in accordance with the second embodiment of the invention.

In accordance with the invention, the variable impedance device is electrically connected to one of the pair of conductors comprising the electrical power line, such as conductor 11 as embodied in FIGS. 1 and 4. As embodied in FIG. 3, an input terminal 22 and output terminal 23 are provided for electrically connecting the conductor plate to one of the pair of conductors.

The variable impedance device, in accordance with the invention, is also electrically connected to the other of the pair of conductors, such as conductor 12 as embodied in FIGS. 1 and 4. As embodied in FIG. 4, the device is connected to the other conductor 12 by means of a ground plate 24.

FIG. 1 is a schematic of a circuit for terminating an arc across a spark gap. Preferably, conductors 11 and 12 are a pair of conductors forming an electrical power line, typically a 120 volt DC power line. Power source 13 typically provides 10 amps of direct current under normal conditions. Resistor 14 represents the impedance across the electrical line.

In accordance with the invention, electrodes 15 and 16 are a pair of spaced electrodes connected to the pair of conductors 11 and 12, respectively. The spaced electrodes form a spark gap. Common types of spark gap are the sphere gap, rod gap, horn gap, and needle gap. An arc can pass between the electrodes at times when a transient voltage or surge voltage on the electrical line exceeds a predetermined value, referred to as the breakdown voltage for the spark gap. A variety of configurations for the spark gap can be used to obtain a wide range of breakdown values at which an arc will begin to pass. For the 120 volt DC power line, a typical range of breakdown voltages used for the spark gap is between 150 and 450 volts.

When a high-energy transient on the electrical line is present, ionization in the spark gap occurs and a space charge region is created around electrodes 15 and 16. Tremendous heat is generated by the discharge between electrodes 15 and 16. If electrode 15 is the cathode, then electrons will be emitted from electrode 15 and strike the electron-collecting electrode 16, or anode. The electrons striking the electrode 16 result in secondary emission of additional electrons, which together with thermal electrons maintain the space charge region in the spark gap and enable current to pass between the electrodes, even when the voltage across the electrodes returns to its normal level. With alternating current, the discharge or arc is normally terminated when the voltage across the electrodes passes through zero volts the first time after the arc was generated. With direct current, however, such as provided by power source 13 in FIG. 1, there is no periodic zero passage for the voltage, and the arc is not extinguished.

In accordance with the invention, in order to extinguish or terminate the arc passing between electrodes 15 and 16 at times when the voltage on the electrical line is reduced below the breakdown value, a low impedance capacitor is utilized. As embodied herein, capacitor 17 is connected to electrodes 15 and 16 by means of a pair of low impedance leads 18 and 19, respectively. An example of a low impedance capacitor is a coaxial feed-through type.

The value of the capacitance for capacitor 17 is not critical by itself. The critical parameter in extinguishing the arc between electrodes 15 and 16 is the total impedance between electrodes 15 and 16 provided by the alternate current path through capacitor 17 and leads 18 and 19. For a 120 volt DC line and a breakdown voltage ranging between 150 and 450 volts, it is preferable that the total impedance between electrodes 15 and 16, which includes the impedance of the leads and the capacitor, should not exceed 1 milliohm and 15 nanohenries when the capacitor has a capacitance ranging between 1 and 6 microfarads. If the capacitance is increased, the maximum impedance of the capacitor and leads that will enable termination of the arc will increase, although the relationship is not linear. This maximum allowable impedance is not dependent on the DC line voltage, except that most spark gaps are self-extinguishing for circuits in which the normal value of the line voltage is less than 20 volts.

In accordance with the invention, leads 18 and 19 have low impedance by having a preselected length and cross-sectional area. Thus, short leads are preferable, and/or leads having a large area. As here embodied, the arc was extinguished when leads 18 and 19 were made out of cylindrical copper rod and were not more than one-half inch long and not less than one-quarter inch in diameter. The contact resistance of the leads must also be kept to a minimum.

For a given value of capacitance, short squat capacitor configurations are preferable to long thin structures because this generally results in a lower impedance. As embodied herein, the arc was terminated using a capacitor ranging between about 1 and 6 microfarads and having a low internal leakage inductance and minimum internal resistance (about 15 nanohenries and 1 milliohm).

The mechanism by which the low impedance capacitor terminates the arc is not well understood. It is believed ionization of the spark gap is inhibited by the capacitor by depletion of the space charge region around electrodes 15 and 16 of electrons. The capacitor provides an alternate path or temporary sink for electrons without crossing the spark gap, and also prevents any AC voltage or AC fields from existing across the spark gap. As a result, it is believed that thermal electrons alone must maintain the arc, which results in a cooling of the spark gap and terminating of the discharge.

Figure 2:
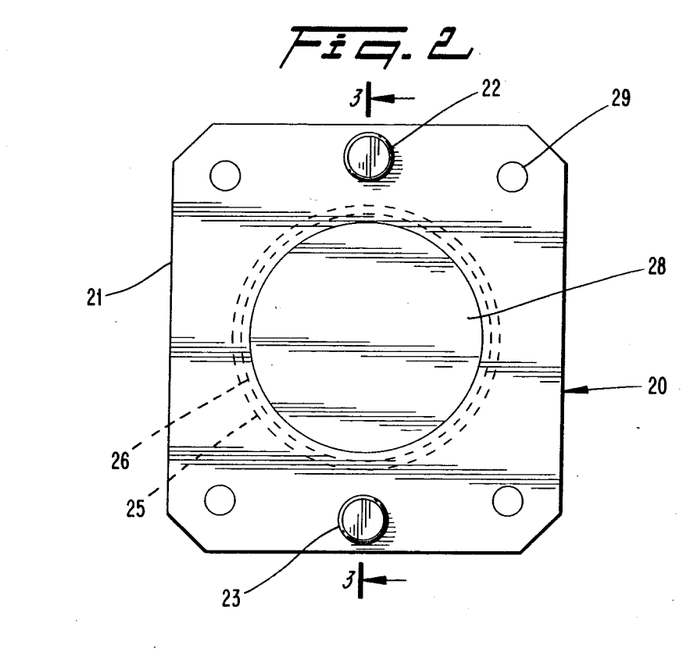
FIG. 2 is a top view of a circuit assembly constructed in accordance with a second embodiment of the invention.

FIGS. 2, 3, and 4 are drawings of a second embodiment of the invention which includes a circuit assembly 20 for diverting to ground a high-energy transient on one conductor of an electrical power line. In accordance with the invention, the circuit has conductor plate 21, which includes input terminal 22 for receiving energy from the one conductor and output terminal 23 for returning energy to the one conductor. Terminals 22 and 23 are spaced apart from each other along plate 21. In accordance with the invention, there is also provided a ground plate that is adapted to be electrically connected to ground. As embodied herein, the conductor and ground plates 21, 24 are spaced apart, and preferably are substantially parallel to each other.

In accordance with the invention, a varistor is electrically connected to a region of ground plate 24, and is electrically connected to a region of conductor plate 21. As embodied herein, varistor 25 is disposed between conductor plate 21 and ground plate 24. The varistor has a non-linear current/voltage characteristic, and preferably is a metal-oxide-varistor. It exhibits a low impedance only at times when the voltage across it exceeds a predetermined value. The breakdown voltage of a varistor can vary greatly, and depends on the thickness of the varistor.

When a high-energy transient above the breakdown voltage appears on one conductor of the electrical power line, which can be either an AC or DC power line, most of the energy is diverted to ground through varistor 25. Current passes from conductor 11 to input terminal 22, to conductor plate 21, and most of it then flows through varistor 25 to ground plate 24 rather than to output terminal 23 and back to conductor 11. The ground plate is usually grounded. It can be connected to ground by means of the other conductor of the electrical line, as shown in FIG. 4, or can be directly connected to ground.

The stripline configuration of conductor plate 21, combined with the use of physically separated input and output terminals 22 and 23, results in improved performance for high frequency transients. For high frequency transients on the order of several megahertz and above, a significant amount of self-inductance exists along conductor plate 21. In accordance with the invention, the input and output terminals are spaced a distance not less than the distance between the input terminal and the region of the conductor plate 21 electrically connected to the varistor. The self-inductance along conductor plate 21 results in the impedance between the input terminal and the conductor plate region connected to varistor 25 being less than the impedance between input terminal 22 and output terminal 23. Preferably, varistor 25 is a disk electrically connected to a region of conductor plate 21 located exactly midway between the input and output terminals. As a result, the self-inductance along plate 21 between the conductor plate region and each of the terminals is equal, whereas any additional inductance between the conductor plate region and the varistor is approximately an order of magnitude smaller. Thus, for a 10 kilovolt transient at 100 MHz, only approximately 1 kilovolt will pass from the input terminal to the output terminal and back onto the one conductor of the electrical line. In contrast, in a varistor assembly with a single input/output terminal connected to the electrical line, approximately 8 kilovolts would remain on the one conductor and can damage the circuit components being protected. Using parallel conductor and ground plates and the spaced-apart terminals of the present invention, transients were attenuated having frequencies as high as 1 GHz, whereas attempts using a single input/output terminal resulted in degraded performance for transients having frequencies above 2-3 MHz.

As embodied herein, an expansion plate 26 is between and in contact with, and therefore is electrically connected to, varistor 25 and a region of conductor plate 21. Conductor plate 21 has a cylindrical cavity of approximately the same depth as the thicknesses of varistor 25 and expansion plate 26. Expansion plate 26 is preferably a disk and is the only contact between varistor disk 25 and conductor plate 21. Therefore, the varistor disk is sandwiched between the ground plate and the expansion plate. A screw plug 28, or other restraint device, is part of conductor plate 21 and is formed of the same material, and ensures that expansion plate 26 and varistor 25 are in pressure contact with conductor plate 21 and ground plate 24. Preferably, conductor plate 21 should be large enough to totally cover varistor disk 25, and for terminals 22 and 23 to be located on opposite sides of varistor 25 so that current flowing between the two terminals must pass the region of conductor plate 21 of electrical connection to expansion plate 26 and varistor 25. The larger the cross-section of the varistor disk, the larger the amount of transient current that can be passed to ground. Although the relative diameters are not critical, the preferred embodiment utilizes an intermediate-sized expansion plate 26, a relatively small screw plug 28, and a relatively large varistor 25 in order to prevent arcing from occurring around the edges of the varistor disk to the ground plate.

As embodied herein, an insulating film 27 is provided and is disposed between and separating the conductor and ground plates to prevent them from contacting each other. Mylar, or polyethylene terephthalate resin, is preferred, and has inherent thermal stability, along with outstanding strength, electrical properties, and chemical inertness. The film 27 is typically 0.2 millimeters thick. Preferably, mounting means are provided to urge the conductor plate and ground plate together against the insulating film and against the intervening varistor and expansion plate. As embodied herein, the mounting means comprises mounting bolts 29. The mounting means maintains the assembly in an enclosed condition and prevents it from blowing apart into an open-circuit upon a change of state of the varistor in response to a very high-energy transient. Additionally, if film 27 melts during vaporization or melting of varistor 25, the mounting means causes conductor plate 21 to be shorted to ground plate 24. Ground plate 24 and expansion plate 26 can be selected to withstand any specified high-energy transient by increasing the size of the plates.

Existing assemblies for varistors are typically made of molded plastic and literally blow up for very high-energy transients above the breakdown voltage. The circuit assembly of this invention is designed to divert any higher-energy transients to ground in order to protect circuit components. If a very high-energy transient destroys or damages the varistor or insulating film, it will result in the permanent shorting of conductor plate 21 to ground plate 24. This permanent grounding of the electrical line is useful in weapons systems, which typically have backup power for the circuit components. Therefore, subsequent high-energy transients after destruction of the varistor will continue to be diverted to ground, preventing damage to circuit components that can continue to function on backup power.

Destruction of the varistor in response to very high-energy transients occurs due to high heat, causing a change of state of at least some of the varistor material, i.e., melting or vaporizing some of the varistor material, which then solidifies into an amorphous material that maintains a low impedance conductive path between the conductor and ground plates, provided the resulting varistor material can be kept enclosed in the cavity between the conductor and ground plates. High pressure is created when portions of the varistor vaporize due to the very high-energy transient. Conductor plate 21 can bend upward slightly in order to allow some of the gases and molten material to escape. The gases escape between the conductor and ground plates at the location of the insulating film. The insulating film can be melted, resulting in a permanent low impedance path between the conductor and ground plates because of mounting means urging the plates together. Furthermore, when the varistor is destroyed, arcing can occur between the conductor and ground plates and may result in a welding of the plates together.

Preferably, expansion plate 26 is made of a material, such as aluminum, that has a higher thermal expansion coefficient than the conductor plate, which is typically made of steel. The varistor disk is made of a ceramic material having a low expansion coefficient, and a prime failure mode for a varistor occurs when it begins to crack. The use of an aluminum expansion plate allows thermal stresses on the circuit assembly to be minimized by making the expansion and contraction in an axial direction over a given temperature range of the region of conductor plate 21 electrically connected to the varistor and overlying the cylindrical cavity substantially equal to the expansion and contraction inside that cavity of the combination of expansion plate 26 and varistor disk 25 in the axial direction. This compensates for expansion and contraction of the conductor plate region and prevents damage to the varistor at high and low temperatures due to axial compression and expansion forces, thereby decreasing the probability of varistor cracking.

Preferably, a sealant 30 is used to coat varistor 25, other than the surfaces contacting ground plate 24 or expansion plate 26. The sealant prevents arcing around the edge of the varistor disk, and improves reliability by protecting varistor 25 from environmental contamination. The sealant also coats the exterior surfaces of the insulating film not in contact with the ground or expansion plates, preventing contamination of the dielectric interface. The preferred material is silicone, or polysiloxane, although any elastomer sealant can be used, with silicone exhibiting good stability at high temperatures.

It will be further apparent to those skilled in the art that various modifications and variations can be made to the instant invention without departing from the scope or spirit of the invention, and it is intended that the present invention cover the modifications and variations provided that they come within the scope of the appended claims and their equivalents.

What is claimed is:

1. A circuit for terminating a DC arc across a spark gap, comprising:
   an electrical DC power line including a pair of conductors for providing a DC voltage;
   a pair of spaced electrodes connected to the pair of conductors and forming a spark gap, being operative to pass an arc between the electrodes at times when the sum of a high-energy transient and the DC voltage on the DC power line exceeds a predetermined value; and
   means for accelerating termination of a DC arc passing between the electrodes after the sum of the high-energy transient and the DC voltage on the DC power line is reduced below the predetermined value, the termination means including
   a low impedance capacitor for accelerating termination of the DC arc, and
   a low impedance pair of leads, connected to the pair of spaced electrodes and to the low impedance capacitor and having a preselected length and cross-sectional area, for providing a low impedance connection between the pair of spaced electrodes and the low impedance capacitor.

2. A circuit in accordance with claim 1, wherein the capacitance of the capacitor is between 1 and 6 microfarads, and the resistance of the capacitor and the pair of leads is not more than about 1 milliohm.

3. A circuit in accordance with claim 2, wherein each of the pair of leads is cylindrical in cross section having a diameter not less than about one-quarter inch, and the preselected length of each of the pair of leads is not more than about one-half inch.

4. A circuit in accordance with claim 2, wherein the capacitor and the pair of leads have an inductance of not more than about 15 nanohenries.

5. A circuit in accordance with claim 1, wherein the predetermined value is between about 150 and 450 volts.

6. A circuit for diverting to ground a high-energy transient on one conductor of an electrical power line including a pair of conductors, comprising:
   a conductor plate including an input terminal and an output terminal spaced from said input terminal for electrically connecting said conductor plate to said one conductor;
   a ground plate adapted to be electrically connected to ground, said ground plate being substantially parallel to and spaced from the conductor plate; and
   a varistor disposed between and electrically connected to a region of said conductor plate and of said ground plate, said varistor having a low impedance only at times when the voltage on said conductor plate exceeds a predetermined value, for diverting to ground the high-energy transient on said one conductor;
   said input terminal and output terminal being spaced a greater distance apart than the distance between the input terminal and said region of said conductor plate electrically connected to said varistor, wherein at high frequencies the impedance between the input terminal and the output terminal is greater than the impedance between the input terminal and the varistor.

7. A circuit in accordance with claim 6, and further comprising:
   an insulating film disposed between and separating the ground plate and the conductor plate.

8. A circuit in accordance with claim 7, in which the insulating film is comprised of polyethylene terephthalate resin.

9. A circuit in accordance with claim 7, further comprising:
   mounting means for urging the conductor plate and ground plate together against the insulating film, for maintaining a low impedance conductive path between said conductor plate and said ground plate upon a change of state of said varistor in response to a very high-energy transient.

10. A circuit for diverting to ground a high-energy transient on one conductor of an electrical power line including a pair of conductors, comprising:
    a conductor plate including an input terminal and an output terminal spaced from said input terminal for electrically connecting said conductor plate to said one conductor;
    a ground plate adapted to be electrically connected to ground, said ground plate being substantially parallel to and spaced from the conductor plate;
    an insulating film disposed between and separating the ground plate and the conductor plate;
    a varistor disposed between and electrically connected to a region of said conductor plate and of said ground plate, said varistor having a low impedance only at times when the voltage on said conductor plate exceeds a predetermined value, for diverting to ground the high-energy transient on said one conductor;
    mounting means for urging the conductor plate and ground plate together against the insulating film, for maintaining a low impedance conductive path between said conductor plate and said ground plate upon a change of state of said varistor in response to a very high-energy transient; and
    an expansion between and in contact with the conductor plate and the varistor, said expansion plate being comprised of a material having a higher thermal expansion coefficient than the conductor plate for compensating for expansion and contraction of said region of electrical connection of said conductor plate in an axial direction;
    said input terminal and output terminal being spaced a greater distance apart than the distance between the input terminal and said region of said conductor plate electrically connected to said varistor, wherein at high frequencies the impedance between the input terminal and the output terminal is greater than the impedance between the input terminal and the varistor.

11. A circuit in accordance with claim 10, wherein the conductor plate is comprised of steel and the expansion plate is comprised of aluminum.

12. A circuit in accordance with claim 10, and further comprising:
    a sealant coating the surfaces of the varistor and the insulating film not in contact with any one of the conductor plate, expansion plate, and ground plate.

13. A circuit in accordance with claim 12, in which the sealant is comprised of silicone.

14. A circuit for diverting to ground a high-energy transient on one conductor of an electrical power line including a pair of conductors, comprising:
    a conductor plate including an input terminal and an output terminal spaced from said input terminal for electrically connecting said conductor plate to said one conductor;
    a ground plate adapted to be electrically connected to ground, said ground plate being substantially parallel to and spaced from the conductor plate;
    a varistor disposed between and electrically connected to a region of said conductor plate and of said ground plate, said varistor having a low impedance only at times when the voltage on said conductor plate exceeds a predetermined value, for diverting to ground the high-energy transient on said one conductor; and
    an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction;
    said input terminal and output terminal being spaced a greater distance apart than the distance between the input terminal and said region of said conductor plate electrically connected to said varistor, wherein at high frequencies the impedance between the input terminal and the output terminal is greater than the impedance between the input terminal and the varistor.

15. A circuit in accordance with claim 14, wherein the conductor plate is comprised of steel and the expansion plate is comprised of aluminum.

16. A circuit for diverting to ground a high-energy transient on one conductor of an electrical power line including a pair of conductors, comprising:
- a conductor plate including an input terminal and an output terminal spaced from said input terminal for electrically connecting said conductor plate to said one conductor;
- a ground plate adapted to be electrically connected to ground, said ground plate being substantially parallel to and spaced from the conductor plate;
- a varistor disposed between and electrically connected to a region of said conductor plate and of said ground plate, said varistor having a low impedance only at times when the voltage on said conductor plate exceeds a predetermined value, for diverting to ground the high-energy transient on said one conductor; and
- an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

17. A circuit in accordance with claim 16, and further comprising:
- an insulating film disposed between and separating the ground plate and the conductor plate.

18. A circuit in accordance with claim 17, in which the insulating film is comprised of polyethylene terephthalate resin.

19. A circuit in accordance with claim 17, further comprising:
- mounting means for urging the conductor plate and ground plate together against the insulating film and for maintaining a low impedance conductive path between said conductor plate and said ground plate upon a change of state of said varistor in response to a very high-energy transient.

20. A circuit in accordance with claim 16, wherein the conductor plate is comprised of steel and the expansion plate is comprised of aluminum.

21. A circuit in accordance with claim 17, and further comprising:
- a sealant coating the surfaces of the varistor and the insulating film non in contact with any one of the conductor plate, expansion plate, and ground plate.

22. A circuit in accordance with claim 21, in which the sealant is comprised of silicone.

23. A circuit for diverting to ground a high-energy transient on one conductor of an electrical power line including a pair of conductors, comprising:
- a conductor plate including an input terminal and an output terminal spaced from said input terminal for electrically connecting said conductor plate to said one conductor;
- a ground plate adapted to be electrically connected to ground;
- a varistor disposed between and electrically connected to a region of said conductor plate and of said ground plate, said varistor having a low impedance only at times when the voltage on said conductor plate exceeds a predetermined value, for diverting to ground the high-energy transient on said one conductor; and
- means for supplying a greater impedance at high frequencies between the input terminal and the output terminal compared to the impedance at high frequencies between the input terminal and the conductor plate region connected to the varistor, to attenuate a high frequency high-energy transient on said one conductor by passing most of the high frequency high-energy transient from the input terminal to said conductor plate region rather than to the output terminal.

24. A circuit in accordance with claim 23, in which the greater impedance supplying means is provided by spacing the input terminal and the output terminal a greater distance apart than the distance between the input terminal and said conductor plate region.

25. A circuit in accordance with claim 24, in which the conductor plate has a stripline configuration, and the ground plate is substantially parallel to and spaced from the conductor plate.

26. A circuit in accordance with claim 23, in which the conductor plate has a stripline configuration, and the ground plate is substantially parallel to and spaced from the conductor plate.

27. A circuit in accordance with claim 25, in which the input and the output terminals are at opposite ends of the conductor plate, and said conductor plate region is between the input and the output terminals.

28. A circuit in accordance with claim 24, in which the input and the output terminals are at opposite ends of the conductor plate, and said conductor plate region is between the input and the output terminals.

29. A circuit in accordance with claim 27, and further comprising:
- an insulating film disposed between and separating the ground plate and the conductor plate; and
- mounting means for urging the conductor plate and ground plate together against the insulating film, for maintaining a low impedance conductive path between said conductor plate and said ground plate upon a change of state of said varistor in response to a very high-energy transient.

30. A circuit in accordance with claim 26, and further comprising:
- an insulating film disposed between and separating the ground plate and the conductor plate; and
- mounting means for urging the conductor plate and ground plate together against the insulating film, for maintaining a low impedance conductive path between said conductor plate and said ground plate upon a change of state of said varistor in response to a very high-energy transient.

31. A circuit in accordance with claim 25, and further comprising:
- an insulating film disposed between and separating the ground plate and the conductor plate; and
- mounting means for urging the conductor plate and ground plate together against the insulating film, for maintaining a low impedance conductive path between said conductor plate and said ground plate upon a change of state of said varistor in response to a very high-energy transient.

32. A circuit in accordance with claim 24, and further comprising:
- an insulating film disposed between and separating the ground plate and the conductor plate; and
- mounting means for urging the conductor plate and ground plate together against the insulating film, for maintaining a low impedance conductive path between said conductor plate and said ground plate upon a change of state of said varistor in response to a very high-energy transient.

33. A circuit in accordance with claim 31, and further comprising:
   an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

34. A circuit in accordance with claim 30, and further comprising:
   an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

35. A circuit in accordance with claim 29, and further comprising:
   an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

36. A circuit in accordance with claim 27, and further comprising:
   an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

37. A circuit in accordance with claim 26, and further comprising:
   an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

38. A circuit in accordance with claim 25, and further comprising:
   an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

39. A circuit in accordance with claim 24, and further comprising:
   an expansion plate between and in contact with the conductor plate and the varistor, said expansion plate being comprised of a material having a higher thermal expansion coefficient than the conductor plate for compensating for expansion and contraction of said region of electrical connection of said conductor plate in an axial direction.

* * * * *